Oct. 19, 1943.                F. D. CAMPBELL                2,332,436
                                TRANSMISSION
                            Filed Jan. 31, 1940            2 Sheets-Sheet 1
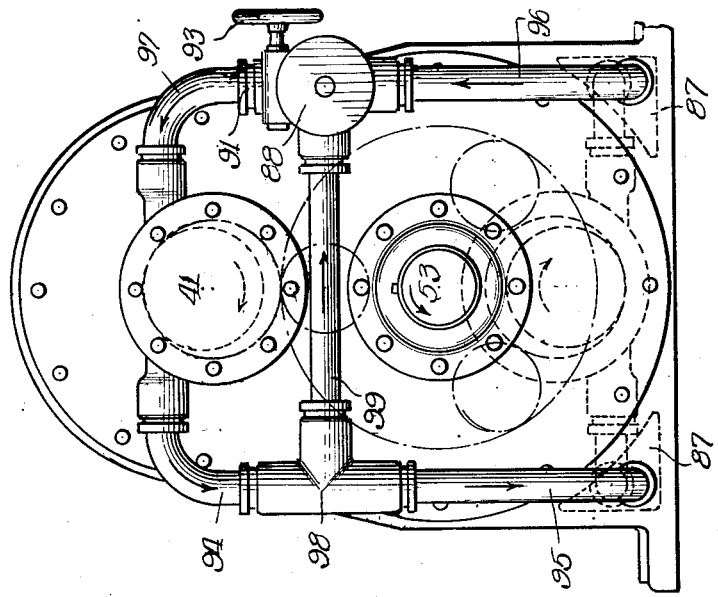
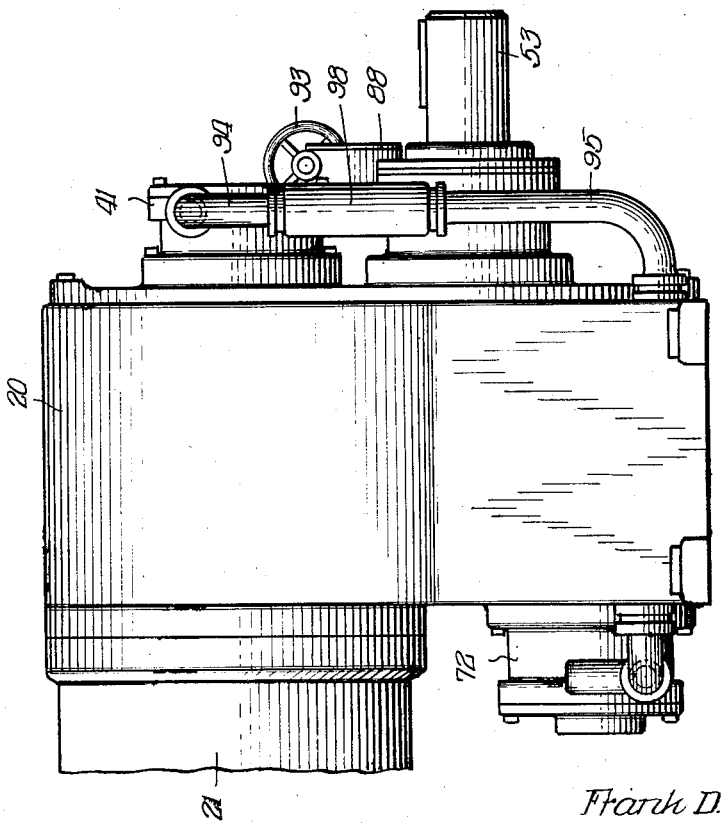
INVENTOR.
Frank D. Campbell,
BY
C. G. Stellings
ATTORNEY.

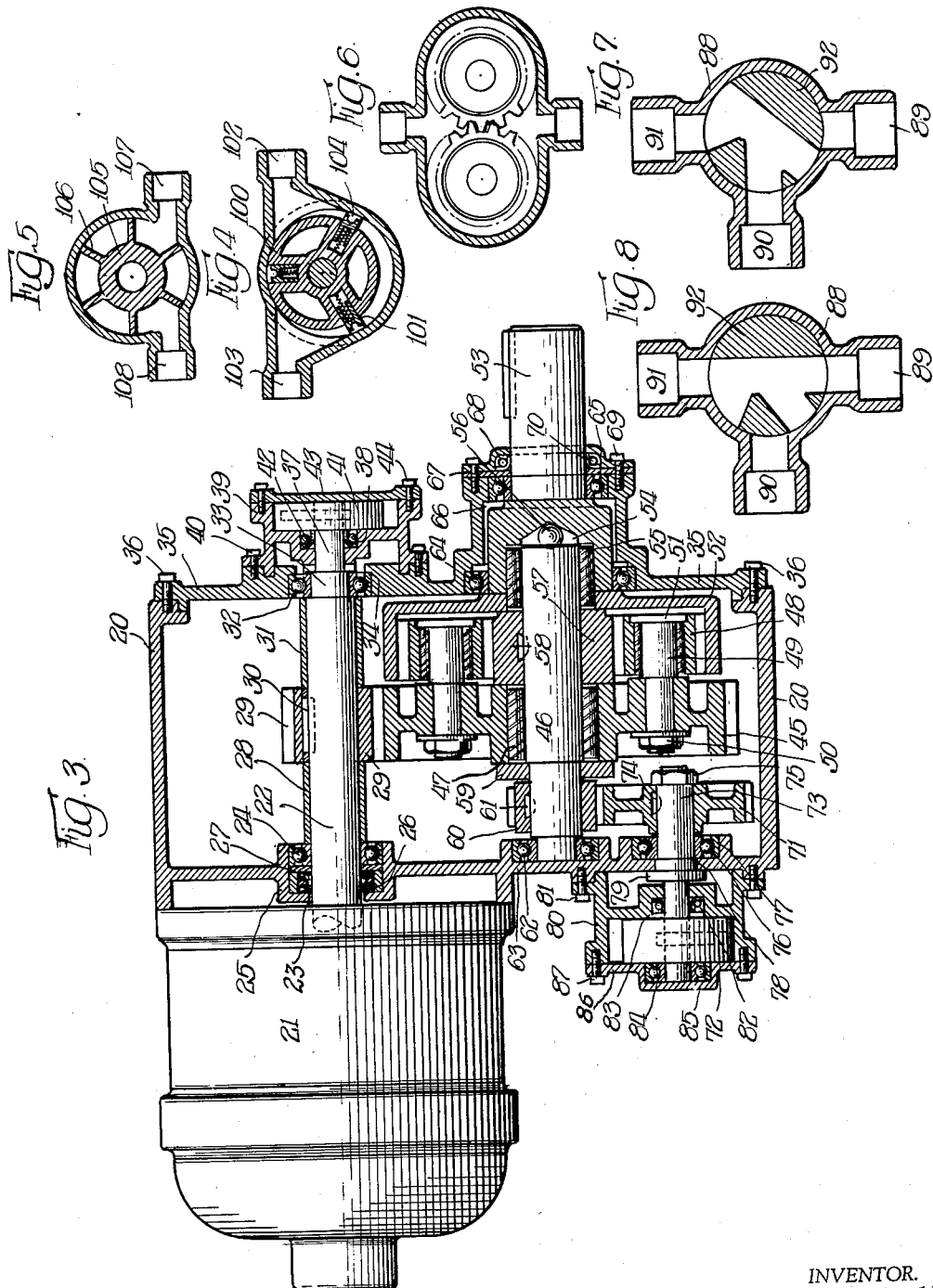

Patented Oct. 19, 1943

2,332,436

UNITED STATES PATENT OFFICE 2,332,436

TRANSMISSION

Frank D. Campbell, Chicago, Ill.

Application January 31, 1940, Serial No. 316,471

5 Claims. (Cl. 74—189.5)

This invention has to do primarily with transmissions for industrial uses such as stationary installations, as contrasted to motor vehicular installations, although the principles of the device are adaptable to use in certain types of motive equipment.

More particularly, this invention is intended for use where a variable speed transmission is desired, with speeds ranging from "zero" revolutions per minute of the output shaft to the full speed of the permanent primary reduction and an additional speed up to the limit of the planetary gear ratio. The range of speed therefore is infinitely variable up to greater than direct.

It is a further object of this invention to provide a transmission in which the driving elements constitute more or less standardized mechanical gear connections, the variability of speed of the output shaft is accomplished by hydraulically controlled means.

It is a further object of this invention to provide a transmission wherein the driving elements are composed of mechanical gear connections, and in which the variability of the speed of the output shaft is secured by hydraulic governors; a primary and secondary hydraulic governor being generally provided with an oil circulating piping system between the two, and connections from the primary governor controlling the speed of a sun gear whereby restricting the speed of the primary hydraulic governor by reducing oil flow thereto reduces the speed of the sun gear and correspondingly increases the speed of a ring gear, and the output shaft driven by the ring gear.

It is a further object to provide a transmission adaptable to the requirements of any type of prime mover such for example as electric motor, steam engine, combustion engines of all types, etc.

It is a further object to provide a device which will be adaptable to use with many alternating current electric motor applications where direct current motors and a special source of direct current power (or accompanying motor generator sets for required conversion to direct current of alternating incoming power) must be used at the present time. This substitution of variable transmission for direct current motors and motor generator sets will constitute a great saving in initial investment, floor space and maintenance costs.

It is an object to provide a transmission which may be accurately controlled by the hydraulic governors, which is adaptable to use for driving a unit of machinery in timed relationship to other units, particularly those driven by means disclosed herein. In this connection some large industrial plants such as newspaper printing establishments in which a large number of presses and other machinery must be synchronized, have had to provide costly equipment, and equipment which is generally not entirely satisfactory, for synchronization, many times having to use converters changing A. C. current to D. C. current and special control means for all units. With the use of the device herein provided, much of the complicated and expensive machinery is eliminated, and economical driving means using A. C. current if desired may be used.

It is an object to provide an hydraulic governor which will automatically serve as a valve to cut off oil flow without disturbing the speed adjustment valve setting, when the power is shut off, and which will serve as a gear brake when a braking means such as an electric brake is used on the motor, and which further will serve as a control means when an overhauling load is present, maintaining a pre-selected output speed.

It is an object to provide a device in which a power application is made through gears with only a retardation means applied to one of the gear means to provide an infinite variable range of speed from zero to greater than direct, predetermined by the primary fixed reduction.

Other objects and advantages are:

(a) Moderate manufacturing costs;
(b) Conventional arrangement with regard to motor mounting;
(c) Comparatively compact arrangement not requiring much space;
(d) That it is in principle a gear reducer, using component elements, most or all of which approach gear standards available today on the market;
(e) No excessive gear speeds are set up;
(f) Little or no special machinery is required for its manufacture;
(g) Reasonably long life can be expected since practically all stresses are torque stresses generally compensated for in all machinery today;
(h) Dependability of performance as no adjustments are generally needed to compensate for wear;
(i) Wear of parts will generally not decrease the efficiency of operation to any appreciable extent; and
(j) The governing device is ordinarily lubricated by the control fluid oil, gear greases being required only for a few gear elements, all points being accessible to and provided with lubrication.

It is another object to provide a device which is comparatively inexpensive, many parts of which are or can be procured on more or less standard specifications, and therefore I eliminate special costs applicable to other types of devices which are of special parts construction.

It is a further feature of this invention to provide an arrangement which may be used for governing or breaking overhauling loads where desirable or necessary, by increasing the ratio of reduction.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

In the drawings:

Figure 1 is a rear elevational view partially fragmentary and partially schematic, the relative arrangement of the internal parts being shown in dotted lines and the directions of circulation of the oil being shown by arrows;

Figure 2 is a side elevational view of the device of Figure 1 (the driving means being shown only in part as an electric motor);

Figure 3 is a side elevational view, partially in cross-section, substantially on a vertical plane through the center of the device forming the subject matter of this invention, the power means being shown as an electric motor which is not in cross-section;

Figure 4 is a cross-section through an hydraulic pump forming one or both of the governors;

Figure 5 is a cross-sectional view through a rotary valve which may be used for an hydraulic governor when no overhauling load is involved;

Figure 6 is a cross-sectional view of another form of pump which may be used as a primary hydraulic governor;

Figure 7 is a cross-section of a speed adjustment valve, the view showing the position in which the output shaft of the invention is rotating at maximum speed;

Figure 8 is a cross-sectional view corresponding to Figure 7, except that the speed adjustment valve is set for zero rotations of the output of the invention—in other words, the position in which the output shaft does not revolve.

Referring more in detail to the construction shown in the various figures, and especially Figures 1, 2 and 3, I have provided the gear case 20, which constitutes the housing for the device herein described. As will be clearly apparent from later description, this gear case has removable portions, allowing easy access to the gears and parts inside, and providing an easy way of assembling the various parts.

A source of power, such as the electric motor or the like 21, is provided; the drive shaft of the motor may be integral with the drive shaft 22 of the transmission. Such a construction is indicated here. The drive shaft 22 passes through an opening 23 in the gear case, in the arrangement here provided, and is journaled in the bearing race 24, it being free to rotate under power by the motor 21, or an over-running load, as will be explained later. The bearing race 24, is carried by the bearing cup 25, which is a portion of the gear case 20. Within the bearing cup 25 is also provided the oil seal 26 which is separated from the bearing race 24 by a washer 27, which fits around the drive shaft 22.

It is desirable to have the drive shaft 22 provided with the sleeve 28 which abuts against the bearing race 24 at the end adjacent the motor 21, and abuts against the motor pinion 29 at its other end. Since the motor pinion 29 is keyed or otherwise fixed to the shaft 22, as indicated by the key 30, it will form a stop for the sleeve 28 at one end and the sleeve itself will prevent any tendency of the shaft 22 to move toward the motor, thus keeping the pinion 29 properly aligned and the shaft properly journaled in the bearing race 24. On the side of the shaft opposite the sleeve 28 there is another similar sleeve 31 which abuts at one end against the pinion 29 and at the other end against the bearing race 32. The drive shaft 22 is reduced in diameter and journaled in said bearing race 32 in a manner similar to that in connection with the journaling of the drive shaft 22 in the bearing race 24. The reduced portion of the drive shaft above described is indicated by the numeral 33.

The bearing race 32 is carried in a bearing cup 34 in the end plate 35, which end plate forms a removable portion of the gear case 22. This end plate is held removably fixed to the gear case 20 by bolts or the like 36. A further reduction in the diameter of the drive shaft 22 is shown by that portion indicated by the numeral 37, and will be hereafter referred to as second drive shaft reduction to distinguish it from the first drive shaft reduction 33. The second drive shaft reduction 37 passes through the opening 38 in the secondary hydraulic governing housing 39, which housing 39 is removably attached to the end plate 35 by means of the bolts 40. The secondary hydraulic governor 41 is attached to and driven by the drive shaft 22, by means of the second drive shaft reduction 37. The construction of the secondary hydraulic governor 41 will be explained later in connection with Figures 4 and 5 in particular. The oil seal is provided in connection with the housing 39 whereby oil is prevented from passing from the secondary hydraulic governor back into the gear case through the opening 38 and the bearing cup 34. The secondary hydraulic governor housing 39 is provided with a removable cover plate 43, retained in place by means of the bolts or the like 44 on the secondary hydraulic governor housing. Removal of the cover plate 43 permits easy access to the mechanism inside the secondary hydraulic governor housing, and assists in assembling and dis-assembling the unit forming the subject matter of this invention.

I have provided a spur gear 45, with teeth meshing with the motor pinion whereby rotation of the shaft 22 is transmitted through the pinion 29 to the spur gear 45. This spur gear 45 is carried by although not attached to the secondary shaft 46. Preferably the roller bearings or the like 47 are provided so that the spur gear 45 will revolve around the shaft 46 with a minimum of friction, regardless of the movement of the shaft 46 in its rotations.

The spur gear 45 carries one or more, preferably three, planet gears 48, which are carried on the web of the spur gear 45 so that if the latter revolves the planet gears 48 move in a circumferential arc at the speed of the spur gear 45—that is, for each revolution of the spur gear 45, the planet gears 48 complete an arc of 360 degrees.

These planet gears 48 are attached to the spur gear 45 by means of the bolt shafts 49. These bolt shafts 49 are preferably reduced in circumference at the portion passing through the spur gear 45, so that a shoulder is formed holding the shaft portion carrying the planet gear in adjusted position so that the planet gears will not bind against the spur gear 45. The bolt shafts 49 are provided with the nuts 50 and heads 51, the former holding the bolt shaft 49 in position and the latter retaining the planet gears 48 on a bolt shaft 49, particularly against endwise movement away from the spur gear 45.

The planet gears 48 mesh with the teeth on the inner periphery of the flange portion of the ring gear 52. This ring gear 52 is attached to and integral with the output shaft 53, so that rotation of said ring gear 52 corresponds to the rotation of the output shaft 53. The floating sun gear shaft 46 is in a cup 54, hereinafter referred to as ring gear cup, the said floating sun gear shaft 46 being free to rotate irrespective of the rotation of the ring gear 52. Roller bearings or the like 55 are carried in said ring gear cup 54 and reduce the friction between the floating sun gear shaft 46 and the ring gear 52. End thrust-bearing 56 is preferably provided so that floating sun gear shaft 46 is prevented from "jamming" against the end portion of the ring gear causing binding and friction. Preferably the end portion of the floating sun gear shaft 46 has a depression in its center to accommodate said end thrust-bearing 56, and the ring gear cup 54 has its back portion bevelled as shown in Figure 3, so that the bearing 56 will automatically assume the correct position thus providing ease in assembly.

The sun gear 57 meshes with the planet gears 48, as is clearly apparent in Figure 3, and is keyed by means of the key 58 to the floating sun gear shaft 46, so that rotation of the shaft 46 and the sun gear 57 will correspond. The washer 59 is provided on the floating sun gear shaft 46, and preferably this washer is free to rotate, in other words is loose on the shaft 46. It is inserted for the purpose of spacing the spur gear assembly from the sun gear shaft pinion 60. This pinion 60 is keyed by means of the key 61 to the floating sun gear shaft 46, so that its rotations correspond to those of the floating sun gear shaft 46. The sun gear shaft 46 is journaled at one end in the bearing race 62, which is held in place in a cup 63 forming a portion of the gear case 20. Preferably the floating sun gear shaft 46 is reduced in diameter in that portion carrying the washer 59 and the sun gear shaft pinion 60, as will be clearly apparent in Figure 3, and is further reduced at that portion journaled in the bearing race 62. This latter reduction forms a shoulder which maintains the bearing race in the cup 63.

The ring gear 52 is preferably provided with the bearing race 64, which assists in centering the ring gear 52 and the shaft 53. The bearing race 65 is likewise provided, which also assists in centering the shaft 53 and reducing friction. The bearing race 64 and the bearing race 65 are both contained within a cup portion 66 in the end plate 35, which forms a portion of the housing 20. A washer or the like 67 and the cap 68 seal the cup 66. The cap 68 is held in place by means of the bolts 69, the arrangement being such that ease of assembly is provided by removal of the cap 68. The grease retainer 70 is provided within the cap 68, and prevents flow of grease past said cap 68.

The sun gear shaft pinion 60 meshes with the driving gear 71 for the primary hydraulic governor 72. This primary hydraulic governor 72 will be considered in detail later. The primary hydraulic governor shaft 73 is keyed to the driving gear 71 by means of the key 74, and the nut 75 is threaded on to a threaded end portion of said shaft 73, as will be apparent in Figure 3, and retains the shaft 73 against longitudinal movement, cooperating for that purpose with the shoulder of the driving gear 71 which abuts against the bearing race 76. The bearing race 76 forms a journal for the primary hydraulic governor shaft 73, and is in turn retained in a cup 77 in the gear case 20. The primary hydraulic governor shaft preferably passes through the gear case 20 at the opening 78, and is there provided with the flanged portion 79, which operates to prevent the primary hydraulic governor shaft 73 from longitudinal movement in a righthand direction as shown in Figure 3. The primary hydraulic governor housing 80 slips over the shaft 73 at a reduced portion on the lefthand end of said shaft 73, and is attached to the gear case 20 by means of the bolts 81. The primary hydraulic governor housing 80 carries the oil seal 83, which prevents movement of oil from the primary hydraulic governor to the interior of the gear case 20. This oil seal 82 is carried in a cup formed in the primary hydraulic governor housing 80, as shown by the numeral 83.

The primary hydraulic governor shaft 73 is also journaled at its left-hand end in the bearing race 84 carried in a cup portion 85 in a cover plate 86 for the primary hydraulic governor housing 80. The bolts 87 hold the said cover plate 86 in position and are removable for assembling and disassembling the various parts.

It will be seen that ease of assembly is provided by having various portions of the gear case 20 removable, it being contemplated that the various parts be assembled in orderly arrangement before the cover plate 35 is placed on the gear case and the various portions of the secondary and primary governor housings being placed on the assembly in sequence. The operation of assembling is clear from examination of the drawings and it is believed not necessary to explain fully to any greater extent than above set forth.

It will be noted that the planet gears 48 are attached to the spur gear 45; that the sun gear 57 is connected to the primary hydraulic governor 72 through the floating sun gear shaft 46, the sun gear shaft pinion 60, the driving gear 71, and the primary hydraulic governor shaft 73; and the floating sun gear shaft 46 is free of all other connections but supports the spur gear 45. In operation, the drive shaft 22 rotates the motor pinion 29, which in turn always rotates the spur gear 45.

The oil circulating system and the primary hydraulic governors will be described hereafter for the purpose of clearly showing the operation of the inner mechanism of the transmission heretofore described. I will state that the secondary hydraulic governor 41 preferably always operates at maximum output, at the speed of the drive shaft 22. The primary hydraulic governor 72 however has a variable speed determined by the amount of oil flow therethrough, and increasing the oil flow through the primary hydraulic governor will increase the speed of said primary hydraulic governor; and reduction of oil flow through the primary hydraulic governor, will correspondingly restrict the speed, and will determine the rotation speed of the floating sun gear shaft 46 and the sun gear 57, because they are inter-connected as above explained. When the maximum oil flow through the primary hydraulic governor 72 takes place the primary hydraulic governor will reach maximum speed and the sun gear 57 will run ahead freely, driven by the planet gears 48. Since the ring gear 52 depends for its forward drive upon power transmitted through the planet gears 48, if the sun gear 57 is permitted to operate at its maximum speed, the torque on the ring gear 52 will cause the planet gears 48 to "transmit" practically all their power to the sun gear 57, and said planet gears 48 will merely "roll around" the ring gear 52 without driving the ring gear. Consequently, no appreciable useful power will ordinarily be transmitted to the drive shaft 53.

Restricting the speed of the sun gear 57 by restricting the oil flow through the primary hydraulic governor 72 will result in power being transmitted from the planet gears 48 to the ring gear 52. The greater the restriction, the more power, and when the oil flow is entirely cut off through the primary hydraulic governor 72, the ring gear 52 will rotate faster than the spur gear 45.

Assume for example that the ring gear is ten (10) inches diameter, the sun gear is five (5) inches diameter, the planet gear two and five-tenths (2.5) inches diameter with a 3:2 ratio in the back gears to the primary hydraulic governor 72, the primary hydraulic governor will rotate at two-thirds the sun gear speed, and the sun gear will rotate three times the fixed reduction spur gear speed with the ring gear at rest. This is when maximum oil flow takes place through the primary hydraulic oil governor. With the oil flow through the primary hydraulic governor entirely shut off and the sun gear at rest the ring gear will rotate 1.5 times the spur gear speed. Assuming a twelve hundred (1200) R. P. M. motor a 4:1 ratio between the spur gear 45 and the motor pinion 29. The sun gear 57 will have a range of rotation from zero (0) to six hundred (600) R. P. M.; the ring gear range will be from four hundred fifty (450) R. P. M. to zero (0); and the planet gears will have a range from six hundred (600) R. P. M. to twelve hundred (1200) R. P. M.

As above clearly indicated the basic principle of this type of reducer and transmission is a power application through gears with only a retardation means applied to one of the three gear elements of the primary gear set to provide an infinitely variable range pre-determined by the primary fixed reduction.

Referring primarily to Figures 1, 2, 7 and 8, I have provided a fluid system controlling the primary hydraulic governor 72. The piping system uses a reservoir 87 in the base of the gear case 20, for a supply of liquid. Preferably, an oil is used for the liquid, such as a light lubricating oil. However, such solutions as brake fluids or almost any other liquid might be used. Since the secondary hydraulic governor 41 always rotates at the speed of the drive shaft 22, and preferably has at all times a maximum liquid displacement, it is necessary to by-pass some or all of this liquid to reduce the speed of the primary hydraulic governor 72. Consequently, unless the primary hydraulic governor 72 is operating in full speed a by-pass must be provided. This by-pass is accomplished by means of the valve shown in Figures 7 and 8. These two figures represent the same mechanism, except Figure 7 shows the position of the valves when the liquid is being by-passed and when the primary hydraulic governor is receiving no liquid. The position of the valve in Figure 8 shows a maximum opening for the flow of liquid through the primary hydraulic governor 72. I have designated this valve "88," and it has the reservoir inlet 89, the by-pass inlet 90, and the outlet 91. The valve cylinder 92 is rotated by means, not shown, connected with the valve handle or the like 93 as shown in Figure 1. The connection is such that rotation of the handle 93 rotates the valve cylinder between the position shown in Figures 7 and 8.

Referring primarily to Figure 1, and to Figures 7 and 8, the liquid fills the piping system and reservoir to a substantial degree. Turning the handle 93 to a position where the valve 88 is at the setting shown in Figure 8, causes liquid to be driven from the secondary hydraulic governor 41 through the pipes 94 and 95, through the reservoir 87 and primary hydraulic governor 72 into the other side of the reservoir 87, through the inlet pipe 96, valve 88, and pipe 97 back into the secondary hydraulic governor 41. This represents a complete circuit.

With the valve 88 set at the position shown in Figure 7, the flow of fluid through the pipe 96 and the reservoir inlet 89 is blocked by the cylinder 92, and the fluid will flow through the "T" 98, the by-pass pipe 99, through by-pass inlet 90, the valve 88, the outlet 91 and pipe 97 into the secondary hydraulic governor and thus complete the circuit. This "short circuits" the fluid and none passes through the primary hydraulic governor 72 which is held in position because of the "static" condition of the liquid in the inlet pipe 96 and corresponding reservoir 87. The cylinder 92 may be rotated by degrees so that fluid will flow through both the by-pass 99 and the inlet 96, thus giving a restricted flow through the primary hydraulic governor 72, and correspondingly permitting a restricted rotation of the said primary hydraulic governor causing a reduced speed under the arrangement above set out in connection with the explanation of the gear elements.

Referring particularly to Figure 4, I have provided a suitable hydraulic governor for use as either or both the primary and secondary hydraulic governors. Preferably the rotor 100 is centered at a position away from the center of the casing, so that fluid could pass freely on one side thereof controlled only by the plungers 101. These plungers carry fluid entering through the pump inlet 102 underneath the rotor 100 as shown in Figure 4, and forces it out through the pump outlet 103. The plungers then are forced into the rotor 100 as shown and complete the rotation, picking up another load of fluid on the other side for the next rotation. The feet 104 are preferably beveled or rounded to conform to the contour of the valve surface, and are provided with a compensating means consisting of a tongue-and-groove arrangement as clearly apparent in Figure 4. This results in the feet 104 matching the surface of the pump casing regardless of the positions on the inner surface of the casing of the feet 104.

Figure 5 shows an arrangement of rotary valve which may be substituted for the secondary hydraulic governor when no overhauling load is involved. The purpose of this rotary valve is primarily to cut off flow to the primary hydraulic governor when the machine is at rest, to prevent creeping or movement of the sun gear. This operates independently of the valve 88 for that purpose.

The valve rotor 105 is centralized in this valve, and is provided with the fins or blades 106. The liquid enters the inlet orifice 107, is passed by the fins 106 to the outlet orifice 108 and is discharged into the piping system.

Figure 6 shows a form of gear pump well known to automobile engineers and mechanics, which may be substituted for the hydraulic governor shown in Figure 4 or the rotary valve of Figure 5, it merely being necessary to connect one of the gear wheels to the drive shaft in the obvious way.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. A device of the class described, comprising in combination, a gear case, a drive shaft from a motor or the like, said drive shaft being journaled for rotation in said gear case, a motor pinion rotated by said drive shaft, a spur gear meshing with and driven by said motor pinion, said spur gear being journaled on a floating sun gear shaft, and free to rotate with respect thereto, a sun gear carried by said floating sun gear shaft and rotatable therewith, a ring gear with an output shaft integral with it, said output shaft being rotatably journaled in said gear case and said ring gear having bearing means on said floating sun gear shaft, one or more planet gears carried by said spur gear and meshing with said sun gear and said ring gear whereby rotation of the spur gear carries the planet gear or gears irrespective of whether the latter are rotating with respect to the ring gear, the sun gear, or both, a sun gear shaft pinion on said floating sun gear shaft and rotatable therewith, a driving gear, driven by said sun gear shaft pinion, said driving gear being keyed or otherwise fastened to a primary hydraulic governor shaft which is rotatably journaled in the gear case above mentioned, a primary hydraulic governor on said hydraulic governor shaft and attached thereto for rotation therewith, a secondary hydaulic governor attached to and driven by said motor drive shaft first abovementioned, fluid conduit means between said primary and secondary hydraulic governors, which fluid conduit means comprise one or more fluid reservoirs and pipe or pipes forming a complete circuit, a by-pass between said primary and secondary hydraulic governors whereby liquid in said conduit moves from said secondary hydraulic governor through a portion of said conduit and by-pass and back into said secondary hydraulic governor without passing through said primary hydraulic governor, and manually operable valve means controlling the flow of the fluid through the portion of the circuit having the primary hydraulic governor or the portion having the by-pass at the option of the operator.

2. A device of the class described comprising in combination a gear case, a motor drive shaft, a motor pinion rotated by said drive shaft, a spur gear driven by said motor pinion, said spur gear being rotatably journaled on a floating sun gear shaft, a planet gear carried by said spur gear, a sun gear on said floating sun gear shaft, and meshing with said planet gear, ring gear also meshing with said planet gear, an output shaft driven by said ring gear, and control means retarding the rotations of the sun gear and thus transferring power from the planet gear to the ring gear and drive shaft, said control means comprising a primary hydraulic governor, intermediate gearing from said primary hydraulic governor to the floating sun gear shaft, a secondary hydraulic governor on the motor driving shaft first above-mentioned, fluid conduit means carrying fluid between the primary and secondary hydraulic governor, a by-pass in said fluid conduit means adapted to by-pass the fluid around said primary hydraulic governor, and valve means controlling the fluid passing through said secondary hydraulic governor whereby quantities from zero to the full output of the secondary hydraulic governor, at the option of the operator, are passed through said primary hydraulic governor.

3. A device of the class described comprising in combination a constantly meshing primary gear train from a drive shaft through a motor pinion, a spur gear, a planet gear, and a ring gear to an output shaft, and means controlling the transfer of power from the planet gear to the ring gear, said means comprising a sun gear meshing with said planet gear, said sun gear being connected through a chain of intermediate gearing to a primary hydraulic governor, and means controlling the primary hydraulic governor whereby it is held stationary thus holding the sun gear stationary and providing a maximum transfer of power from the planet gear to the ring gear, and means likewise controlling the primary hydraulic governor whereby it is rotated from zero R. P. M. up to the full speed of the primary fixed reduction, said last two mentioned controlling means for the primary hydraulic governor comprising a secondary hydraulic governor, fluid conduits from the secondary hydraulic governor to the primary hydraulic governor, and means comprising a valve or the like controlling the amount of fluid flowing to the primary hydraulic governor and thus controlling the speed of the primary hydraulic governor.

4. A device of the class described, comprising in combination a driving means including a drive shaft, a driven means comprising a driven shaft, a gear chain between said drive shaft and said driven shaft, said gear chain having a sun gear and planetary gears, which control the comparative speed of the driven shaft to that of the drive shaft, and means controlling the sun gear and through the sun gear the planetary gears by retarding the rotation of the sun gear, said means comprising primary hydraulic governing means drivingly connected to said sun gear, secondary hydraulic governing means drivingly connected to a source of power such as the drive shaft, fluid conduits between said hydraulic governors, a by-pass in said fluid conduits, whereby fluid in said conduits is operably controlled to by-pass the primary hydraulic governor, and a three-way adjustable control valve operable to by-pass predetermining the amounts of fluid through said by-pass, up to the whole of the fluid flowing in the system, thereby controlling the comparable speed of rotation of the primary hydraulic governor, and in that way controlling the rotation of the sun gear and the planet gears and the speed of the driven shaft.

5. A hydraulic control means for a transmission having driving means including a drive shaft, driven means including a driven shaft, a gear chain between said drive means and said driven means, said gear chain including a sun gear and planetary gears comprising: hydraulic governing means controlling the rotation of the sun gear by fluid control, said hydraulic governing means comprising secondary and primary hydraulic governors, conduits between said hydraulic governors, a by-pass on said conduits by-passing said primary hydraulic governor, means operable by said primary hydraulic governor controlling said sun gear, and means in combination with said conduits and by-pass infinitely variable to control the quantity of fluid reaching the primary hydraulic governor without varying the flow of full capacity of fluid through the secondary hydraulic governor, the arrangement being such that reduction of the fluid passing through the primary hydraulic governor restricts the rotation of the sun gear and increases the speed of the driven shaft, the system being thereby operable at the will of the operator in pre-selecting the output speed while the transmission is either operating or at rest and in holding the transmission against counter-torque on the output shaft, whereby movement, creep, or slippage is controlled when the transmission is at rest.

FRANK D. CAMPBELL.